United States Patent
Kim et al.

(10) Patent No.: US 9,882,392 B2
(45) Date of Patent: Jan. 30, 2018

(54) METHOD OF CONTROLLING IMPEDANCE MATCHING WITH RESPECT TO MULTIPLE TARGETS IN WIRELESS POWER TRANSMISSION SYSTEM, AND WIRELESS POWER TRANSMISSION SYSTEM ADOPTING THE METHOD

(71) Applicant: Samsung Electronics Co., Ltd., Suwon-si (KR)

(72) Inventors: Nam Yun Kim, Seoul (KR); Sang Wook Kwon, Seongnam-si (KR); Hyuk Choon Kwon, Seoul (KR); Ki Young Kim, Yongin-si (KR); Dal Hoi Shim, Seoul (KR); Chi Hyung Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 644 days.

(21) Appl. No.: 14/336,595

(22) Filed: Jul. 21, 2014

(65) Prior Publication Data

US 2015/0022017 A1 Jan. 22, 2015

(30) Foreign Application Priority Data

Jul. 22, 2013 (KR) ........................ 10-2013-0086339

(51) Int. Cl.
*H02J 5/00* (2016.01)
*H02J 7/02* (2016.01)
*G05F 1/62* (2006.01)

(52) U.S. Cl.
CPC .............. *H02J 5/005* (2013.01); *H02J 7/025* (2013.01)

(58) Field of Classification Search
CPC .. H02J 5/005; H02J 7/025; G05F 1/625; G05F 1/66; H04B 5/0037
See application file for complete search history.

(56) References Cited

U.S. PATENT DOCUMENTS

| | | | |
|---|---|---|---|
| 2011/0142150 A1 | 6/2011 | Anigstein et al. | |
| 2011/0149788 A1 | 6/2011 | Chuang et al. | |
| 2012/0175968 A1* | 7/2012 | Katsunaga | B60L 11/182 307/104 |
| 2012/0293009 A1* | 11/2012 | Kim | H02H 7/1252 307/104 |
| 2014/0125146 A1* | 5/2014 | Azancot | H01F 38/14 307/104 |

* cited by examiner

*Primary Examiner* — Jared Fureman
*Assistant Examiner* — Rafael Pacheco
(74) *Attorney, Agent, or Firm* — NSIP Law

(57) ABSTRACT

A method of operating a wireless power transmission apparatus includes receiving information on rectifier output voltages from at least one wireless power reception apparatus; determining whether the rectifier output voltages are within a predetermined operating range, and controlling an impedance of the wireless power transmission apparatus based on a result of the determining.

17 Claims, 14 Drawing Sheets

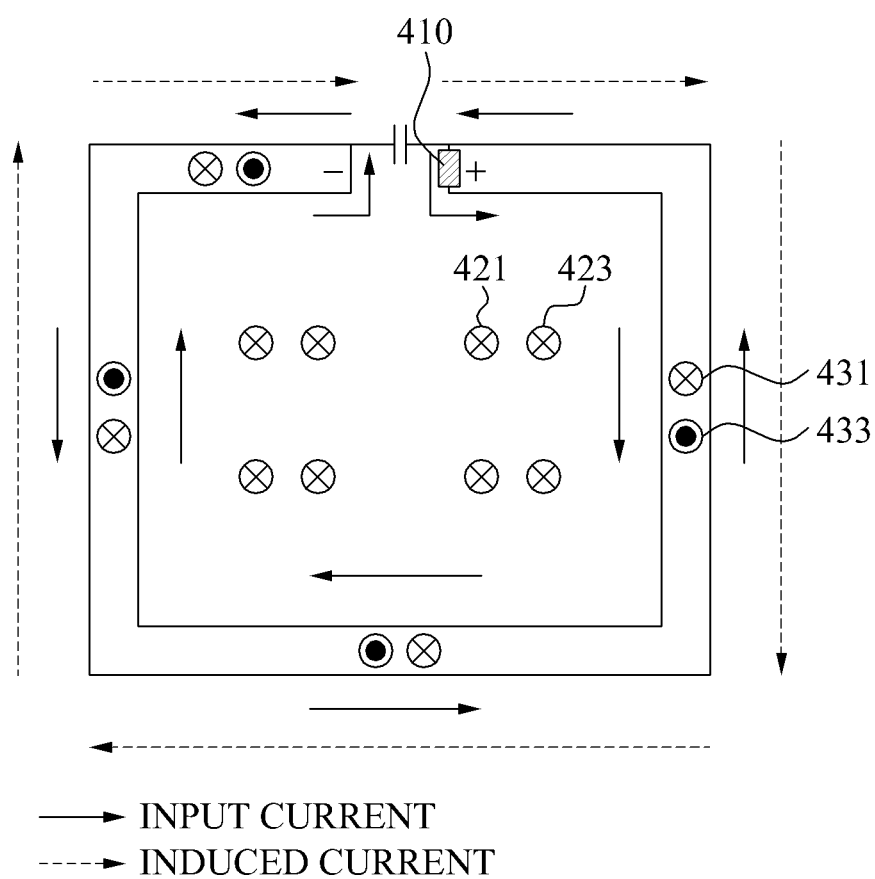

METHOD OF CONTROLLING IMPEDANCE MATCHING WITH RESPECT TO MULTIPLE TARGETS IN WIRELESS POWER TRANSMISSION SYSTEM, AND WIRELESS POWER TRANSMISSION SYSTEM ADOPTING THE METHOD

CROSS-REFERENCE TO RELATED APPLICATIONS

This application claims the benefit under 35 USC 119(a) of Korean Patent Application No. 10-2013-0086339 filed on Jul. 22, 2013, in the Korean Intellectual Property Office, the entire disclosure of which is incorporated herein by reference for all purposes.

BACKGROUND

1. Field

The following description relates to impedance matching control in a wireless power transmission system.

2. Description of Related Art

Wireless power is energy that is transmitted from a power transmitting unit (PTU) to a power receiving unit (PRU) through magnetic coupling. Accordingly, a wireless power transmission system or a wireless power charging system includes a source device and a target device. The source device wirelessly transmits power, and the target device wirelessly receives power. The source device may be referred to as a source or a PTU, and the target device may be referred to as a target or a PRU.

The source device includes a source resonator, and the target device includes a target resonator. Magnetic coupling or resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a wireless power transmission apparatus includes receiving information on rectifier output voltages from at least one wireless power reception apparatus; determining whether the rectifier output voltages are within a predetermined operating range based on the information on the rectifier output voltages; and controlling an impedance of the wireless power transmission apparatus based on a result of the determining.

The method may further include inputting the information on the rectifier output voltages into an impedance matching control circuit of the wireless power transmission apparatus; and the controlling may include operating the impedance matching control circuit to control the impedance of the wireless power transmission apparatus based on the result of the determining.

The method may further include inputting the information on the rectifier output voltages input into a driving voltage unit of the wireless power transmission apparatus; and the controlling further may include operating the driving voltage unit to control the impedance of the wireless power transmission apparatus by adjusting a driving voltage to be applied to the wireless power transmission apparatus based on the result of the determining.

The method may further include inputting the information on the rectifier output voltages into a driving voltage unit of the wireless power transmission apparatus; and the controlling may include operating the driving voltage unit to control the impedance of the wireless power transmission apparatus by adjusting a driving voltage to be applied to the wireless power transmission apparatus based on the result of the determining.

The predetermined operating range may include one of an optimum voltage of each of the rectifier output voltages; an allowable minimum value and an allowable maximum value of each of the rectifier output voltages; an on-state range of each of the rectifier output voltages; and a range calculated based on information on a wireless power transmission efficiency of a wireless power transmitted to the at least one wireless power reception apparatus.

The method may further include comparing the rectifier output voltages to one another; and transmitting, to the at least one wireless power reception apparatus, a control command to compensate for mismatching among the rectifier output voltages.

The transmitting may include transmitting, to the at least one wireless power reception apparatus, an impedance matching command for each of the at least one wireless power reception apparatus to perform impedance matching with the wireless power transmission apparatus.

The transmitting may include transmitting, to the at least one wireless power reception apparatus, a power control command to control an output power of a direct current-to-direct current (DC/DC) converter of each of the at least one wireless power reception apparatus.

The transmitting may include transmitting, to the at least one wireless power reception apparatus, a reduce power command for the at least one wireless power reception apparatus to use a reduced power of a predetermined level.

The method may further include calculating a high impedance region and a low impedance region based on the information on the rectifier output voltages; and setting a reference impedance between the calculated high impedance region and the calculated low impedance region; and the controlling may include controlling the impedance of the wireless power transmission apparatus based on the reference impedance.

In another general aspect, a method of operating a wireless power reception apparatus includes transmitting information on a rectifier output voltage to a wireless power transmission apparatus; receiving a control command from the wireless power transmission apparatus; and controlling the rectifier output voltage based on the control command.

The controlling may include controlling an impedance of the wireless power reception apparatus based on the control command using an impedance matching control circuit of the wireless power reception apparatus.

The controlling may include controlling an output power of a direct current-to-direct current (DC/DC) converter of the wireless power reception apparatus based on the control command.

The control command may be generated by the wireless power transmission apparatus based on the information on the rectifier output voltage transmitted to the wireless power transmission apparatus.

The method may further include receiving a wireless power transmitted by the wireless power transmission apparatus; and the transmitting of the wireless power by the wireless power transmission apparatus may include the wireless power transmission apparatus determining whether the rectifier output voltage is within a predetermined operating range, and controlling an impedance of the wireless power transmission apparatus based on a result of the determining.

In another general aspect, a wireless power transmission apparatus includes a communication unit configured to receive information on rectifier output voltages from at least one wireless power reception apparatus; a processor configured to determine whether the rectifier output voltages are within a predetermined operating range; and an impedance matching control circuit configured to control an impedance of the wireless power transmission apparatus based on a result of the determining.

The communication unit may be further configured to provide the information on the rectifier output voltages to the impedance matching control circuit; and the impedance matching control circuit may be further configured to be operated to control the impedance based on the result of the determining.

The apparatus may further include a driving voltage unit configured to supply a driving voltage to the wireless power transmission apparatus; the communication unit may be further configured to provide the information on the rectifier output voltages to the driving voltage unit; and the driving voltage unit may be further configured to be operated to control the impedance of the wireless power transmission apparatus by adjusting the driving voltage based on the result of the determining.

In another general aspect, a method of operating a wireless transmission apparatus includes receiving information on a rectifier output voltage from a wireless power reception apparatus; determining whether an operating parameter of the wireless power transmission apparatus needs to be adjusted based on the information on the rectifier output voltage; and adjusting the operating parameter of the wireless power transmission apparatus in response to a result of the determining being that the operating parameter of the wireless power transmission apparatus needs to be adjusted.

The method may further include transmitting a wireless power to the wireless power reception apparatus; and the adjusting may include adjusting the operating parameter to maximize a wireless power transmission efficiency of the wireless power.

The transmitting may include supplying a driving voltage to a resonator of the wireless power transmission apparatus to generate the wireless power transmitted to the wireless power reception apparatus; and the operating parameter may include either one or both of an impedance of the wireless power transmission apparatus and the driving voltage supplied to the resonator of the wireless power transmission apparatus.

Other features and aspects will be apparent from the following detailed description, the drawings, and the claims.

BRIEF DESCRIPTION OF THE DRAWINGS

FIG. 4A illustrates an example of a distribution of a magnetic field inside a resonator produced by feeding a feeder.

DETAILED DESCRIPTION

Figure 1:
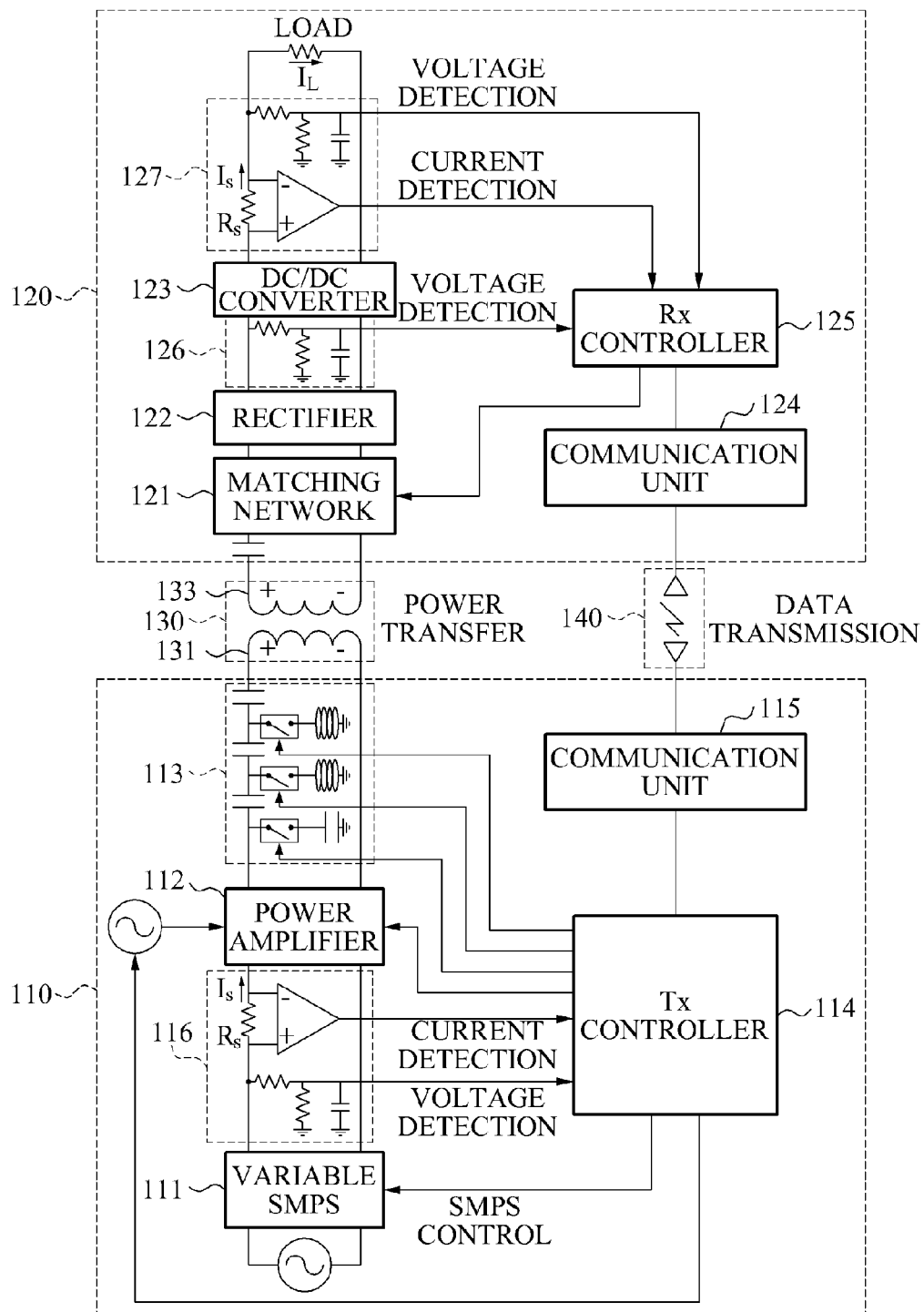
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target, or between a source and another source, may include an in-band communication scheme and an out-of-band communication scheme.

In the in-band communication scheme, the source and the target, or the source and the other source, perform communication using the same frequency that is used for power transmission.

In the out-of-band communication scheme, the source and the target, or the source and the other source, perform communication using a frequency that is different from a frequency used for power transmission.

FIG. 1 illustrates an example of a wireless power transmission and reception system.

Referring to FIG. 1, the wireless power transmission and reception system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112 may in the saturation region with a high efficiency at all times, thereby enabling the maximum efficiency to be maintained at all levels of the output power of the PA 112.

The power detector 116 detects an output current and an output voltage of the variable SMPS 111, and transmits, to the Tx controller 114, information on the detected output current and the detected output voltage. Additionally, the power detector 116 may detect an input current and an input voltage of the PA 112.

The PA 112 generates power by converting a DC voltage having a predetermined level supplied to the PA 112 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is to be transmitted using a resonant frequency in a band of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. The inverter may convert the DC power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a voltage level of the reflected wave and a level of an output voltage of the source resonator 131 or the PA 112. In one example, if the VSWR is greater than a predetermined value, the Tx controller 114 may determine that a mismatch is detected between the source resonator 131 and the target resonator 133.

In another example, if the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the Tx controller 114 may transmit a variety of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various methods. For example, the Tx controller 114 may generate the modulated signal by turning on or off a switching pulse signal, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to sense a change in a temperature of the source 110. The source 110 may receive from the target 120 information regarding the battery state of the target 120, the change in the amount of power received by the target 120, and/or the change in the temperature of the target 120 by communication with the target 120. The source 110 may detect the change in the temperature of the target 120 based on the data received from the target 120.

The Tx controller 114 may adjust a voltage supplied to the PA 112 using a lookup table (LUT). The lookup table may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communication unit 115 may perform out-of-band communication using a separate communication channel. The communication unit 115 may include a communication module, such as a ZigBee module, a Bluetooth module, or any other communication module known to one of ordinary skill in the art that the communication unit 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. In addition, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communication unit 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 using in-band communication.

The target resonator 133 may receive the initial wireless power determined by the transmission controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. Additionally, the detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required by the load and the amount of power actually transferred to the load.

If the amount of the power actually transferred to the load calculated by the Rx controller 125 is transmitted to the source 110 by the communication unit 124, the Tx controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received using the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the Tx controller 114 of the source 110. Depending on whether the reflected wave is detected, the Tx controller 114 may detect a first value, for example, a binary number "0," or a second value, for example a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such as a ZigBee module, a Bluetooth module, or any other communication module known to one of ordinary skill in the art that the communication unit 124 may use to transmit and receive the data 140 to and from the source 110 using the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The source 110 and the target 120 of FIG. 1 may correspond to a wireless power transmission apparatus and a wireless power reception apparatus to be described hereinafter.

In the following description of FIGS. 2A through 4B, unless otherwise indicated, the term "resonator" may refer to both a source resonator and a target resonator. The resonator of FIGS. 2A through 4B may be used as the resonators described with reference to FIGS. 1 and 5 through 11.

Figure 2A:
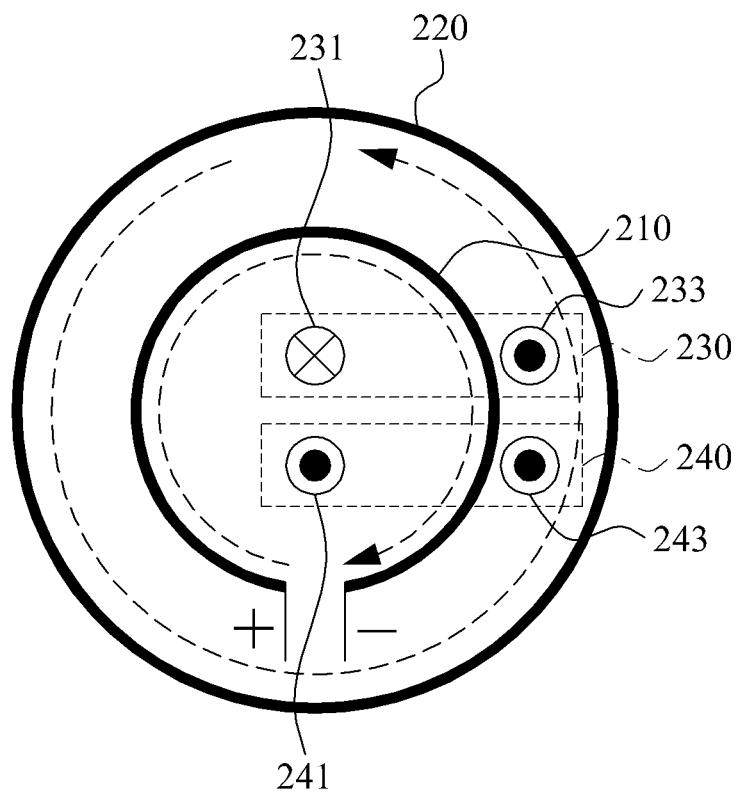
FIGS. 2A and 2B illustrate examples of a distribution of a magnetic field in a feeder and a resonator.
Figure 2B:
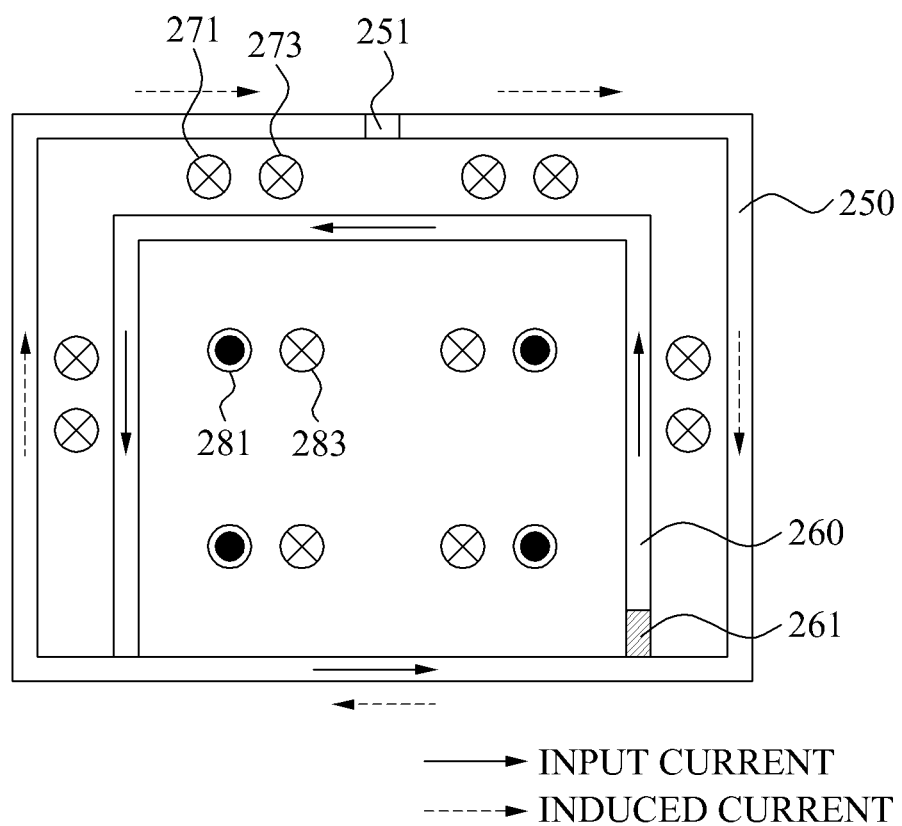

FIGS. 2A and 2B illustrate examples of a distribution of a magnetic field in a feeder and a resonator.

When a resonator receives power supplied through a separate feeder, magnetic fields are generated in both the feeder and the resonator.

A source resonator and a target resonator may each have a dual loop structure including an external loop and an internal loop.

FIG. 2A illustrates an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 through the feeder 210 configured as illustrated in FIG. 2A, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmission apparatus in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Additionally, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is same as a direction 273 of the magnetic field generated by the induced current, and thus the strength of the total magnetic field increases. Conversely, inside the feeder 260, a direction 281 of the magnetic field generated by the input current is opposite to a direction 283 of the magnetic field generated by the induced current, and thus the strength of the total magnetic field decreases. Therefore, the strength of the total magnetic field decreases in the portion of the resonator 250 inside the feeder 260, but increases in the portion of the resonator 250 outside the feeder 260.

An input impedance may be adjusted by adjusting an internal area of the feeder 260. The input impedance is an impedance viewed in a direction from the feeder 260 to the resonator 250. When the internal area of the feeder 260 increases, the input impedance increases. Conversely, when the internal area of the feeder 260 decreases, the input impedance decreases. However, if the magnetic field is randomly or not uniformly distributed in the resonator 250, the input impedance may vary based on a location of a target even if the internal area of the feeder 260 has been adjusted to adjust the input impedance to match an output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
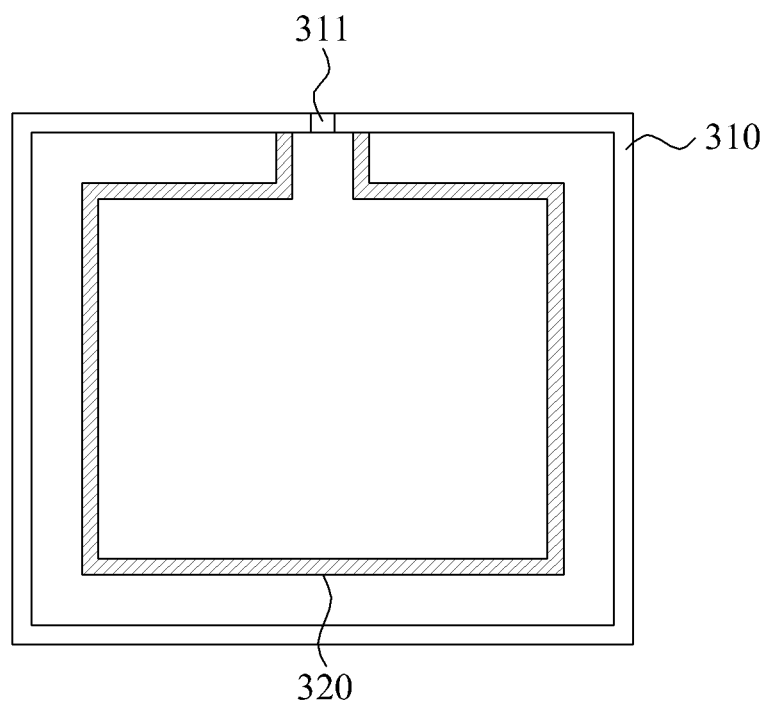
FIGS. 3A and 3B illustrate an example of a wireless power transmission apparatus.
Figure 3B:
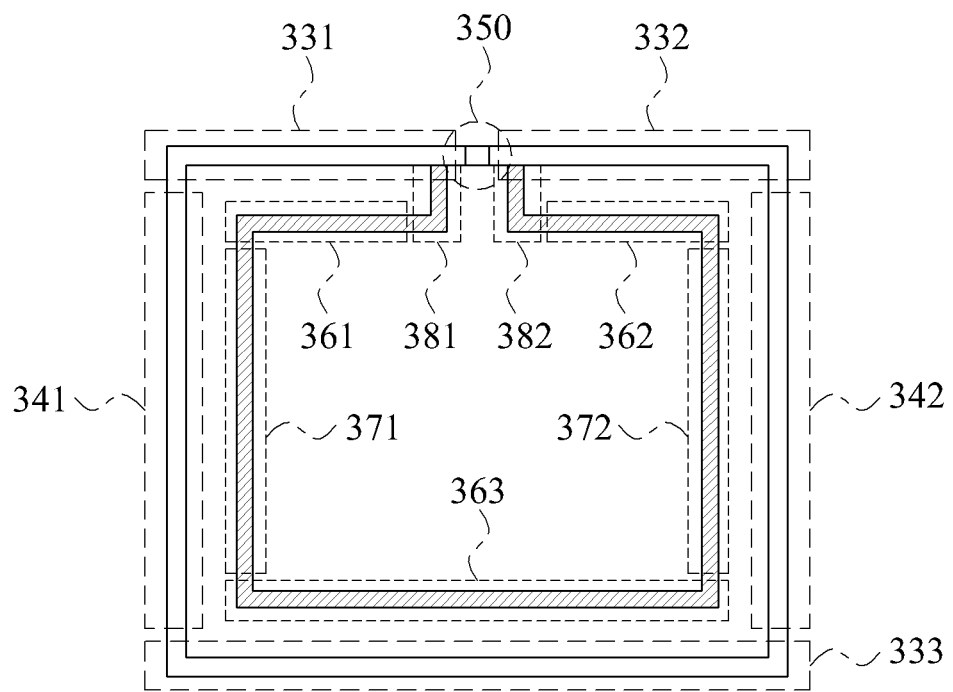

FIGS. 3A and 3B illustrate an example of a wireless power transmission apparatus.

Referring to FIG. 3A, the wireless power transmission apparatus includes a resonator 310 and a feeder 320. The resonator 310 includes a capacitor 311. The feeder 320 is electrically connected to both ends of the capacitor 311.

FIG. 3B illustrates a structure of the wireless power transmission apparatus of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be confined in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 331 and the second signal conducting portion 332.

Additionally, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zig-zagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a magnetic permeability and a permittivity. Most materials have a positive magnetic permeability and a positive permittivity.

In the case of most materials, a right-hand rule may be applied to an electric field, a magnetic field, and a Poynting vector, so the corresponding materials may be referred to as right-handed materials (RHMs). However, a metamaterial having a magnetic permeability and/or a permittivity not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and the capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency of the MNG resonator 310 is independent of a physical size of the MNG resonator 310. The resonant frequency of the MNG resonator 310 having the zeroth-order resonance characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field inside the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 310 has a circular structure, the feeder 320 may also have a circular structure.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIG. 3B will be used in the following description of FIG. 4A for ease of description.

A feeding operation may be an operation of supplying power to a source resonator in wireless power transmission, or an operation of supplying AC power to a rectifier in the wireless power transmission. FIG. 4A illustrates a direction of an input current flowing in the feeder 320, and a direction of an induced current flowing in the resonator 310 operating as a source resonator. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 of FIG. 3B may be used as an input port 410. In the example in FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 381 of the feeder 320 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, in a region between the feeder 320 and the resonator 310, a direction 433 of the magnetic field generated by the input current flowing in the feeder 320 is opposite to a direction 431 of the magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the induced current in the resonator 310 flows in the same direction as the input current in the feeder 320, the strength of the total magnetic field increases inside the feeder 320, and decreases outside the feeder 320. As a result, due to the feeder 320, the strength of the total magnetic field increases in the center of the resonator 310 having the loop structure, and decreases near the outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting power from a source resonator to a target resonator is proportional to the strength of the total magnetic field generated in the source resonator. In other words, when the strength of the total magnetic field increases in the center of the source resonator, the wireless power transmission efficiency also increases.

Figure 4B:
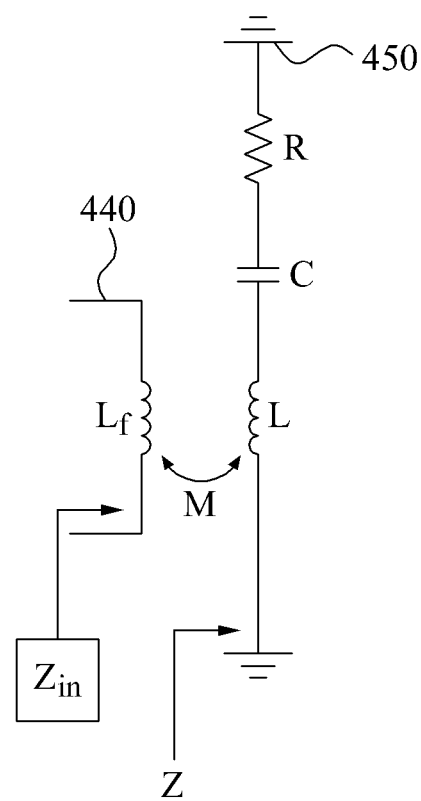
FIG. 4B illustrates an example of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, $\omega$ denotes a resonant frequency of the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In the resonator 450 and the feeder 440 included in a wireless power reception apparatus, a magnetic field may be distributed as illustrated in FIG. 4A. The resonator 450 may operate as a target resonator 450. For example, the target resonator 450 may receive wireless power from a source resonator via magnetic coupling with the source resonator. The received wireless power induces a current in the target resonator 450. The induced current in the target resonator 450 generates a magnetic field, which induces a current in the feeder 440. If the target resonator 450 is connected to the feeder 440 as illustrated in FIG. 4A, the induced current in the target resonator 450 will flow in the same direction as the induced current in the feeder 440. Accordingly, for the reasons discussed above in connection with FIG. 4A, the strength of the total magnetic field will increase inside the feeder 440, but will decrease in a region between the feeder 440 and the target resonator 450.

Hereinafter, for ease of description and conciseness, a "source" and a "wireless power transmission apparatus" may also be referred to as a power transmitting unit (PTU). Also, a "target" and a "wireless power reception apparatus" may also be referred to as a power receiving unit (PRU). A PTU operating in a master mode may be referred to as a "master device", and a PTU operating in a slave mode may be referred to as a "slave device".

A master device may be network-connected to at least one slave device. The expression "network-connected" refers to configuring a network to transmit and receive data between devices. In a network, the master device may operate as a controller of a slave device, and the slave device may be controlled by the master device. The slave device may be synchronized with the master device in terms of a frequency hopping sequence and time. Accordingly, each slave device may transmit and receive data for a predetermined period of time based on the control of the master device, and thus collision or overlapping with another slave device existing in a network may be prevented.

Figure 5:
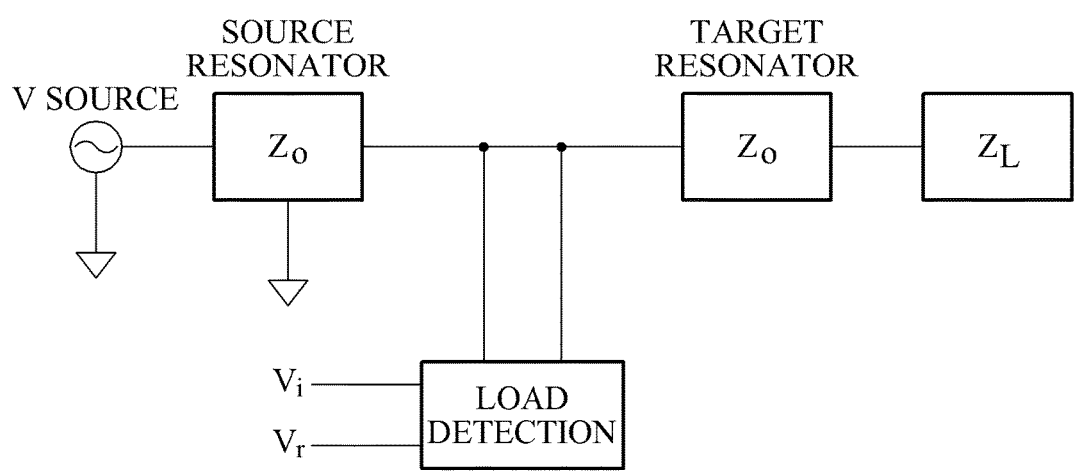
FIG. 5 illustrates an example of a principle of load detection.

FIG. 5 illustrates an example of a principle of load detection.

Referring to FIG. 5, the load detection may be performed, for example, between a source resonator and a target resonator. Various method of load detection are well known to one of ordinary skill in the art, and thus will not be described here for conciseness. In resonant power transmission, a relational expression of voltage based on an impedance between the source resonator and the target resonator may be expressed by the following Equation 2.

$$V_{max} = |V_i| + |V_r| = |V_i| * (1 + |\Gamma|) \quad (2)$$
$$V_{min} = |V_i| - |V_r| = |V_i| * (1 - |\Gamma|)$$
$$VSWR = \frac{V_{max}}{V_{min}} = \frac{|V_i| * (1 + |\Gamma|)}{|V_i| * (1 - |\Gamma|)} = \frac{1 + |\Gamma|}{1 - |\Gamma|}$$

In Equation 2, $V_i$ denotes an output voltage of the source resonator, and $V_r$ denotes a reflected voltage caused by impedance mismatching. A reflection coefficient $\Gamma$ in Equation 2 may be expressed by the following Equation 3.

$$\Gamma = \frac{V_r}{V_i} = \frac{Z_L - Z_o}{Z_L + Z_o} \quad (3)$$

In Equation 3, $Z_o$ denotes an impedance of each of the source resonator and the target resonator, and $Z_L$ denotes an impedance of a load connected to the target resonator. This example assumes that the impedance of the source resonator is matched to the impedance of the target resonator.

Figure 6:
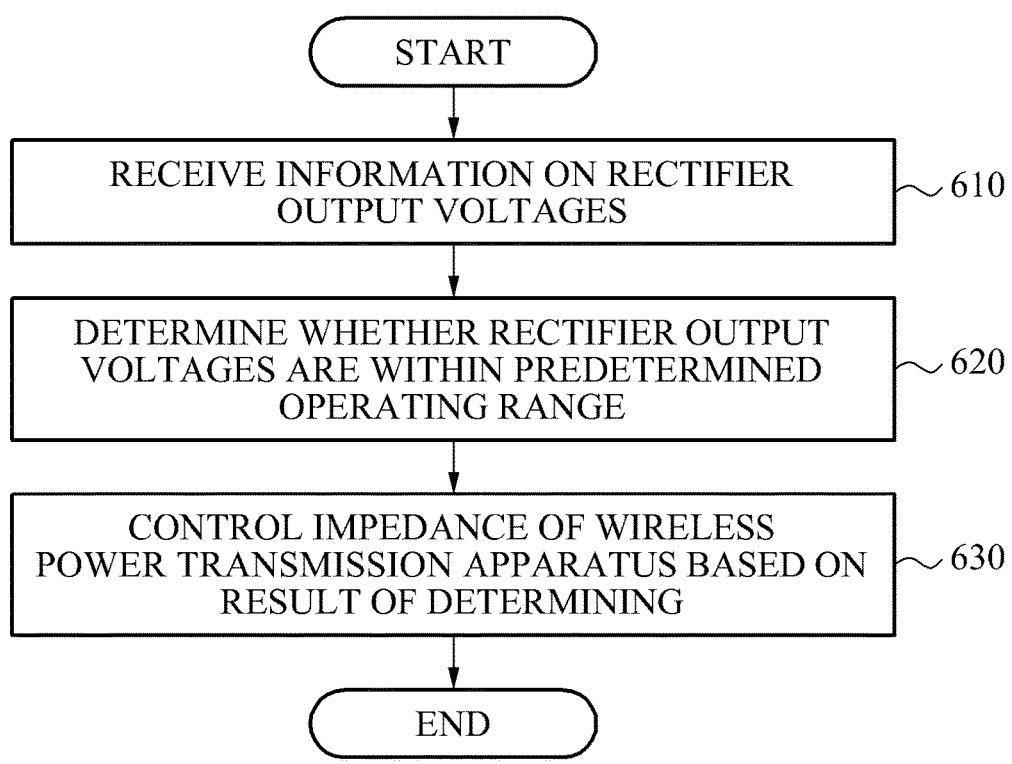
FIG. 6 illustrates an example of a method of controlling an impedance of a wireless power reception apparatus by a wireless power transmission apparatus.

FIG. 6 illustrates an example of a method of controlling an impedance of a wireless power reception apparatus by a wireless power transmission apparatus.

Referring to FIG. 6, in 610, the wireless power transmission apparatus receives information on rectifier output voltages $V_{rect}$ from at least one wireless power reception apparatus. The information on the rectifier output voltages $V_{rect}$ is information related to voltages output from rectifiers of the at least one wireless power reception apparatus. The information on the rectifier output voltages $V_{rect}$ may be received through a communication unit of the wireless power transmission apparatus. The information on the rectifier output voltages $V_{rect}$ is provided to an impedance matching control circuit of the wireless power transmission apparatus and to a driving voltage unit of the wireless power transmission apparatus. Alternatively, the information on the rectifier output voltages $V_{rect}$ may be provided to a processor of the wireless power transmission apparatus that controls the impedance matching control circuit and the driving voltage unit.

The rectifier output voltages $V_{rect}$ are an example of information detectable at outputs of the rectifiers, and may be replaced with other parameters that reflect characteristics of the outputs of the rectifiers. For example, the information on the rectifier output voltages $V_{rect}$ may be replaced with information on rectifier output currents $I_{rect}$ or information on rectifier output powers $P_{rect}$.

In 620, the wireless power transmission apparatus determines whether the rectifier output voltages $V_{rect}$ of the at least one wireless power reception apparatus are within a predetermined operating range. The wireless power transmission apparatus may compare the rectifier output voltages $V_{rect}$ to the predetermined operating range to determine whether the rectifier output voltages $V_{rect}$ of the at least one wireless power reception apparatus are within the predetermined operating range. Information on the predetermined operating range may be prestored in the wireless power transmission apparatus, or received directly from the at least one wireless power reception apparatus.

The predetermined operating range may include any one of an optimum voltage of each of the rectifier output voltages $V_{rect}$, an allowable minimum value and an allowable maximum value of each of the rectifier output voltages $V_{rect}$, an on-state range of each of the rectifier output voltages $V_{rect}$, and a range calculated based on information on a wireless power transmission efficiency of a wireless power transmitted to the at least one wireless power reception apparatus.

The optimum voltage of each of the rectifier output voltages $V_{rect}$ is a predetermined value at which each of the at least one wireless power reception apparatus may be operated in an optimized state with respect to a rectifier output voltage $V_{rect}$ of each of the at least one wireless power reception apparatus. The allowable minimum value and the allowable maximum value of each of the rectifier output voltages $V_{rect}$ are a predetermined voltage range in which each of the at least one wireless power reception apparatus may be operated normally with respect to a rectifier output voltage $V_{rect}$ of each of the at least one wireless power reception apparatus. The on-state range of each of the rectifier output voltages $V_{rect}$ is a voltage range defined in an on-state with respect to a rectifier output voltage $V_{rect}$ of each of the at least one wireless power reception apparatus. The range calculated based on the information on the wireless power transmission efficiency of the wireless power transmitted to the at least one wireless power reception apparatus is a range of a rectifier output voltage $V_{rect}$ of each of the at least one wireless power reception apparatus that is calculated so that the wireless power transmission efficiency of the wireless power will satisfy a predetermined level. For example, the predetermined level may be a value of a rectifier output voltage $V_{rect}$ at which the wireless power transmission efficiency of the wireless power is maximized.

In 630, the wireless power transmission apparatus controls an impedance of the wireless power transmission apparatus. The impedance control of the wireless power transmission apparatus may be performed by the impedance matching control circuit of the wireless power transmission apparatus. The wireless power transmission apparatus may control the impedance of the wireless power transmission apparatus to adjust the rectifier output voltages $V_{rect}$ of the at least one wireless power reception apparatus to be within the predetermined operating range. When the impedance matching control circuit controls the impedance of the wireless power transmission apparatus, powers to be received by the at least one wireless power reception apparatus may be changed, and thus the rectifier output voltages $V_{rect}$ of the at least one wireless power reception apparatus may be adjusted.

The wireless power transmission apparatus may control a driving voltage to be supplied to the wireless power transmission apparatus to adjust the rectifier output voltages $V_{rect}$ of the at least one wireless power reception apparatus. By controlling a driving voltage of the wireless power transmission apparatus, a current to be supplied to a resonator of the wireless power transmission apparatus may be adjusted. The driving voltage may be a driving voltage to be supplied to the resonator of the wireless power transmission apparatus. In this example, powers received by the at least one wireless power reception apparatus may be adjusted, and thus the rectifier output voltages $V_{rect}$ of the at least one wireless power reception apparatus may be adjusted. The driving voltage of the wireless power transmission apparatus may be controlled by the driving voltage unit of the wireless power transmission apparatus.

A method of controlling the rectifier output voltages $V_{rect}$ of the at least one wireless reception apparatus may include (1) a method of controlling the impedance of the wireless power transmission apparatus, (2) a method of controlling the driving voltage of the wireless power transmission apparatus, and (3) a hybrid method using a combination of the method (1) and the method (2) at the same time or at different times. When the rectifier output voltages $V_{rect}$ of the at least one wireless power reception apparatus are adjusted to be within the predetermined operating range, impedance matching between the wireless power transmission apparatus and the at least one wireless power reception apparatus may be achieved, and the wireless power transmission efficiency of the wireless power may be maximized.

The wireless power transmission apparatus may control the rectifier output voltages $V_{rect}$ of the at least one wireless power reception apparatus and perform impedance matching control simultaneously or separately. The impedance matching control is an operation of calculating a high impedance region and a low impedance region based on the information on the rectifier output voltages $V_{rect}$ received from the at least one wireless power reception apparatus, setting a reference impedance between the high impedance region and the low impedance region, and controlling the impedance of the wireless power transmission apparatus based on the reference impedance. The term "region" refers to a voltage range predetermined with respect to the rectifier output voltages $V_{rect}$. The wireless power transmission apparatus may calculate a region greater than an optimal voltage to be the high impedance region, and a region less than the optimal voltage to be the low impedance region. The wireless power transmission apparatus may increase a wireless power transmission efficiency of a wireless power by combining the suggested impedance matching methods, or by employing the suggested impedance matching methods separately.

Figure 7:
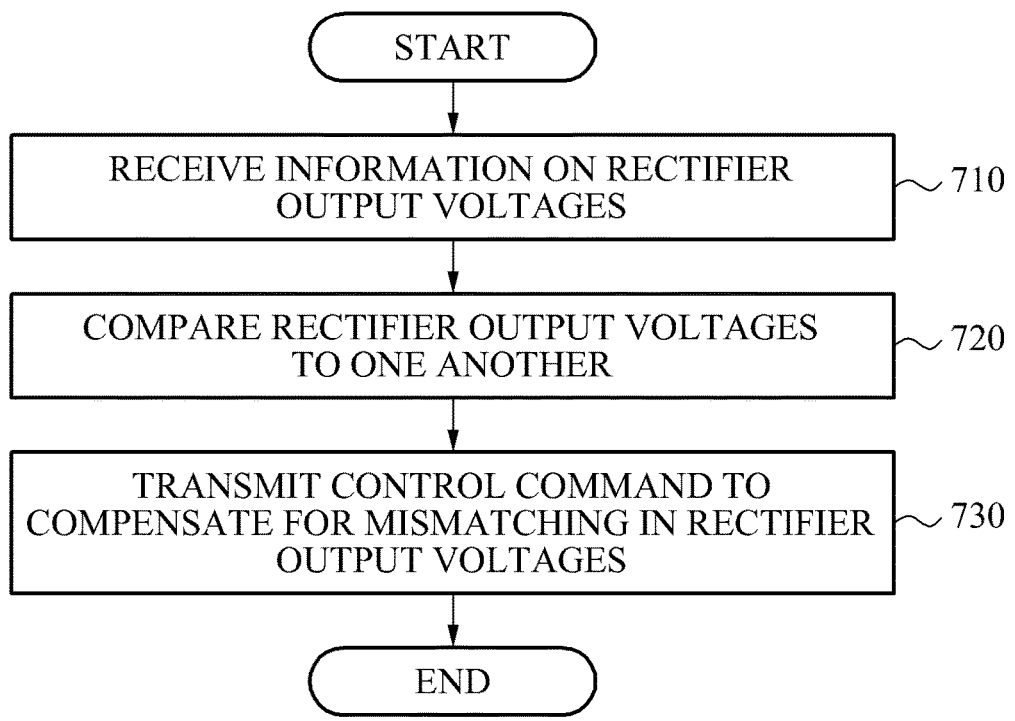
FIG. 7 illustrates an example of a method of compensating for mismatching in rectifier output voltages between wireless power reception apparatuses by a wireless power transmission apparatus.

FIG. 7 illustrates an example of a method of compensating for mismatching in rectifier output voltages between wireless power reception apparatuses by a wireless power transmission apparatus.

When mismatching occurs between rectifier output voltages $V_{rect}$ of a plurality of wireless power reception apparatuses, the mismatching may be compensated for to control impedance matching between the wireless power transmission apparatus and the wireless power reception apparatuses using the rectifier output voltages $V_{rect}$ of the wireless power reception apparatuses. This is because the rectifier output voltage $V_{rect}$ of each of the wireless power reception apparatuses may be controlled when the rectifier output voltage $V_{rect}$ of each of the wireless power reception apparatus is matched to a predetermined level. The mismatching between the rectifier output voltages $V_{rect}$ of the plurality of wireless power reception apparatuses may be caused by a difference in impedance between the wireless power reception apparatuses, a difference in a charging status between the wireless power reception apparatuses, a difference in a distance from the wireless power transmission apparatus between the wireless power reception apparatuses, or any other difference between the wireless power transmission apparatuses that affects the rectifier output voltages $V_{rect}$ of the wireless power reception apparatuses. The mismatching between the rectifier output voltages $V_{rect}$ of the plurality of wireless power reception apparatuses may be compensated for by each wireless power reception apparatus by performing impedance matching separately, or by controlling a power of each wireless power reception apparatus.

Referring to FIG. 7, in 710, the wireless power transmission apparatus receives information on the rectifier output voltages $V_{rect}$. The information on the rectifier output voltages $V_{rect}$ is information on voltages output from rectifiers of the wireless power reception apparatuses. The information on the rectifier output voltages $V_{rect}$ is received from the plurality of wireless power reception apparatuses, respectively. The information on the rectifier output voltages $V_{rect}$ may be received through a communication unit of the wireless power transmission apparatus.

In 720, the wireless power transmission apparatus compares the rectifier output voltages $V_{rect}$ received from the plurality of wireless power reception apparatuses to one another. The operation of comparing the rectifier output voltages $V_{rect}$ to one another may be an operation of comparing the rectifier output voltages $V_{rect}$ to one another to determine whether a difference greater than or equal to a predetermined level is present between the rectifier output voltages $V_{rect}$ received from the plurality of wireless power reception apparatuses. The difference greater than or equal to the predetermined level is a difference in a level of difficulty in adjusting the rectifier output voltages $V_{rect}$ of the plurality of wireless power reception apparatuses to be within the predetermined operating range. For example, when the plurality of wireless power reception apparatuses have different rectifier output voltages $V_{rect}$, the wireless power transmission apparatus may determine that the level of difficulty is high. When the difference greater than or equal to the predetermined level is present between the rectifier output voltages $V_{rect}$, the wireless power transmission apparatus compensates for the mismatching to control the rectifier output voltages $V_{rect}$ of the plurality of wireless power reception apparatuses.

In 730, the wireless power transmission apparatus transmits, to each wireless power reception apparatus, a control command to compensate for the mismatching in the rectifier output voltages $V_{rect}$. The control command to compensate for mismatching may include either one or both of (1) an impedance matching command for each of the plurality of wireless power reception apparatuses to separately perform impedance matching with the wireless power transmission apparatus, and (2) a command to control powers of the wireless power reception apparatuses. The command (2) may include either one or both of (a) a command to adjust an impedance by controlling the power received by each wireless power reception apparatus from the wireless power transmission apparatus, and (b) a reduce power command for each wireless power reception apparatus to use a reduced power of a predetermined level among the power received from the wireless power transmission apparatus.

The wireless power reception apparatus may include an impedance matching circuit to perform the impedance matching command (1) for each of the plurality of wireless power reception apparatuses to separately perform impedance matching with the wireless power transmission apparatus. When an impedance matching command to compensate for the mismatching in rectifier output voltages $V_{rect}$ is received from the wireless power transmission apparatus, the wireless power reception apparatus may match the impedance with the wireless power transmission apparatus using the impedance matching circuit of the wireless power reception apparatus.

In one example, the wireless power reception apparatus may perform, through pulse width modulation (PWM), the command (a) to adjust the impedance by controlling a power received by the wireless power reception apparatus from the wireless power transmission apparatus. The wireless power reception apparatus may include a pulse width controller to perform the command (a). When the reduce power command (b) is received from the wireless power transmission apparatus, the wireless power reception apparatus may adjust the rectifier output voltage $V_{rect}$ of the wireless power reception apparatus so that the wireless power reception apparatus uses the reduced power of the predetermined level among the power received from the wireless power transmission apparatus. The reduced power of the predetermined level may be, for example, a power greater than or equal to 0% and less than or equal to 100% of the power received from the wireless power transmission apparatus.

The description provided with reference to FIG. 7 may be applied simultaneously with the description provided with reference to FIG. 6. For example, when the rectifier output voltages $V_{rect}$ of the plurality of wireless power reception apparatuses are mismatched, the wireless power transmission apparatus may perform the mismatching compensation as described with reference to FIG. 7, and perform the impedance matching by adjusting the rectifier output voltages $V_{rect}$ as described with reference to FIG. 6.

Figure 8:
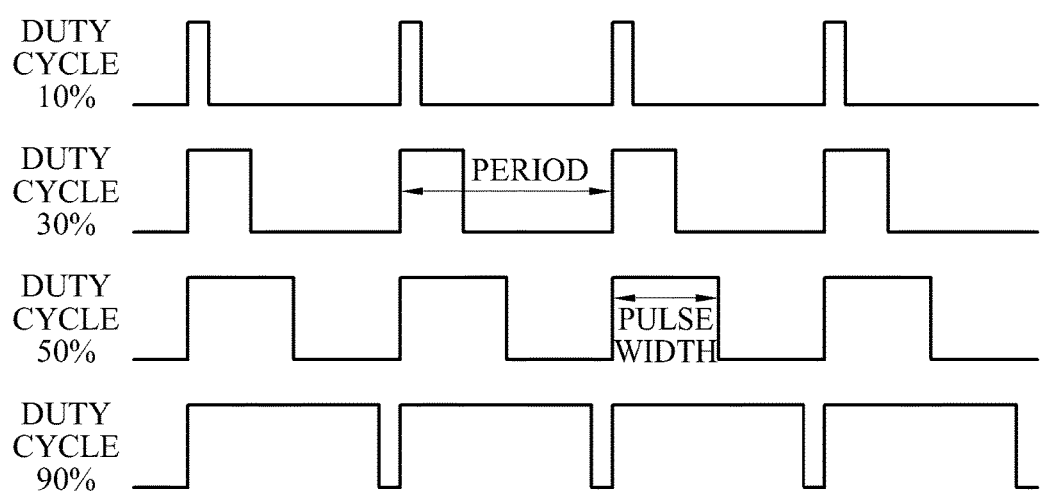
FIG. 8 illustrates examples of pulse width modulation (PWM) waveforms.

FIG. 8 illustrates examples of PWM waveforms.

Referring to FIG. 8, four waveforms have the same period and the amplitude, but have different pulse widths corresponding to duty cycles of 10%, 30%, 50%, and 90%. A wireless power reception apparatus may adjust an impedance and a power received from a wireless power transmission apparatus by controlling a pulse width of the received power while maintaining a period and an amplitude of the received power. The wireless power reception apparatus may perform the aforementioned operation using a pulse width controller. PWM is described as an example of controlling the impedance and the received power by the wireless power reception apparatus, but the wireless power reception apparatus may control the impedance and the received power using other methods known to one of ordinary skill in the art.

Figure 9:
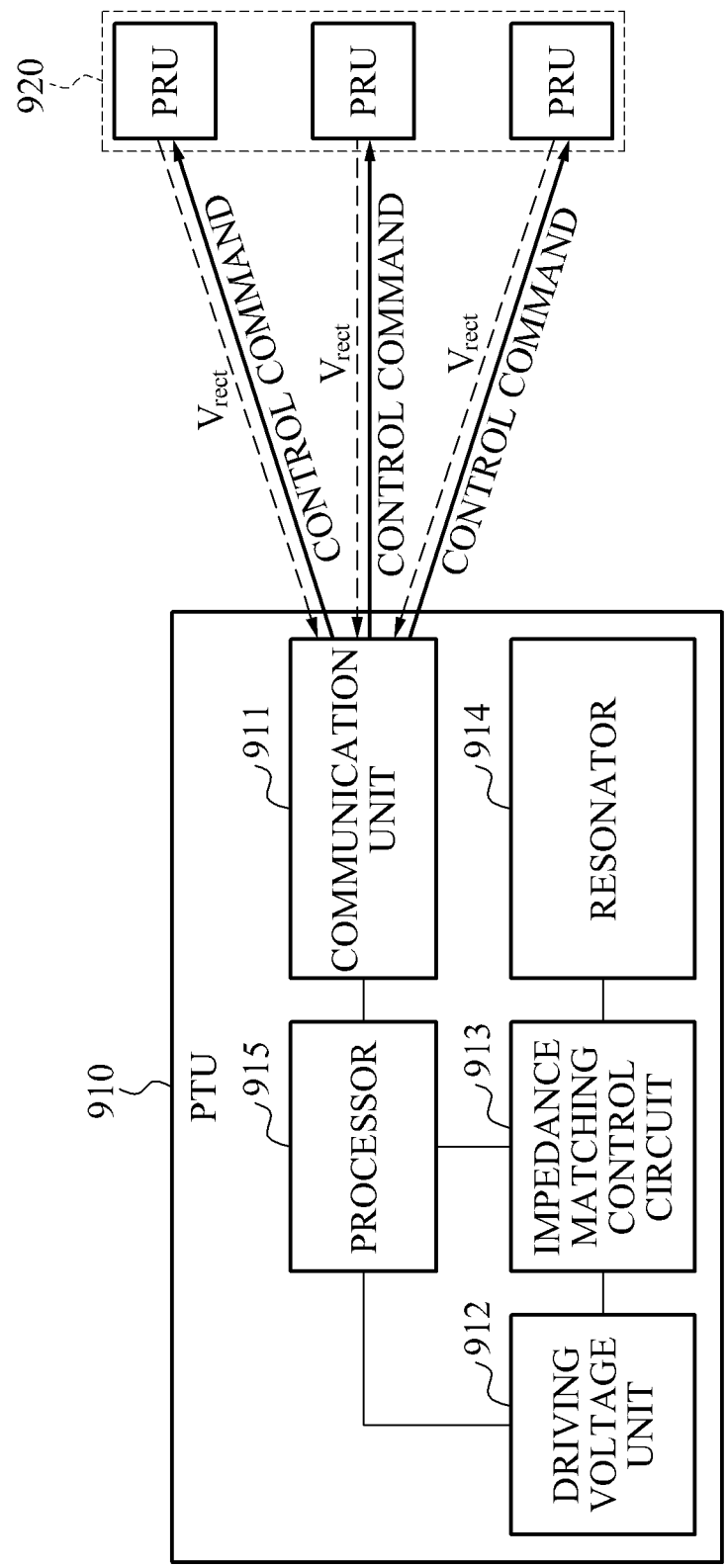
FIG. 9 illustrates an example of an impedance control system from the viewpoint of a power transmission unit (PTU).

FIG. 9 illustrates an example of an impedance control system from the viewpoint of a PTU.

Referring to FIG. 9, the impedance control system includes a PTU 910 and at least one PRU 920.

The PTU 910 includes a communication unit 911, a driving voltage unit 912, an impedance matching control circuit 913, a resonator 914, and a processor 915.

The communication unit 911 receives information on rectifier output voltages $V_{rect}$ from the at least one PRU 920, and transmits a control command to the at least one PRU 920. The control command may be a power control command or an impedance matching command for matching the rectifier output voltages $V_{rect}$. The information on the rectifier output voltages $V_{rect}$ received by the communication unit 911 is provided to the processor 915.

The impedance matching control circuit 913 may adjust an impedance of the PTU 910 to adjust the rectifier output voltages $V_{rect}$ under the control of the processor 915. The processor 915 controls the impedance matching control circuit 913 based on the information on the rectifier output voltages $V_{rect}$ received from the communication unit 911.

The driving voltage unit 912 may adjust a driving voltage supplied to the PTU 910 to adjust the rectifier output voltages $V_{rect}$ under the control of the processor 915. The processor 915 controls the driving voltage unit 912 based on the information on the rectifier output voltages $V_{rect}$ received from the communication unit 911. By adjusting the driving voltage, an amount of wireless power transmitted from the resonator 914 may be controlled.

The processor 915 determines whether the rectifier output voltages $V_{rect}$ are within a predetermined operating range, and may control the impedance matching control circuit 913 based on a result of the determining to control the impedance of the PTU 910 to adjust the rectifier output voltages $V_{rect}$ to be within the predetermined operating range. Alternatively or additionally, the processor 915 may control the driving voltage unit 912 based on a result of the determining to control the driving voltage of the PTU 910 to adjust the rectifier output voltages $V_{rect}$ to be within the predetermined operating range. Also, the processor 925 compares the rectifier output voltages $V_{rect}$ to one another, and based on a result of the comparing, may generate, for each of the PRUs 920, a control command to compensate for the mismatching in the rectifier output voltages $V_{rect}$. The control command may include either one or both of (1) an impedance matching command for each of the PRUs 920 to separately perform impedance matching with the PRU 910, and (2) a command to control powers of the PRUs 920. The command (2) may include either one or both of (a) a command to adjust an impedance by controlling the power received by each PRU 920 from the PTU 910, and (b) a reduce power command for each PRU 920 to use a reduced power of a predetermined level among the power received from the PTU 910. The processor 915 supplies the control commands for the PRUs 920 to the communication unit 911 for transmission to the PRUs 920.

The descriptions provided with reference to FIGS. 6 through 8 are also applicable to each unit shown in FIG. 9, and therefore duplicated descriptions will be omitted for conciseness.

Figure 10:
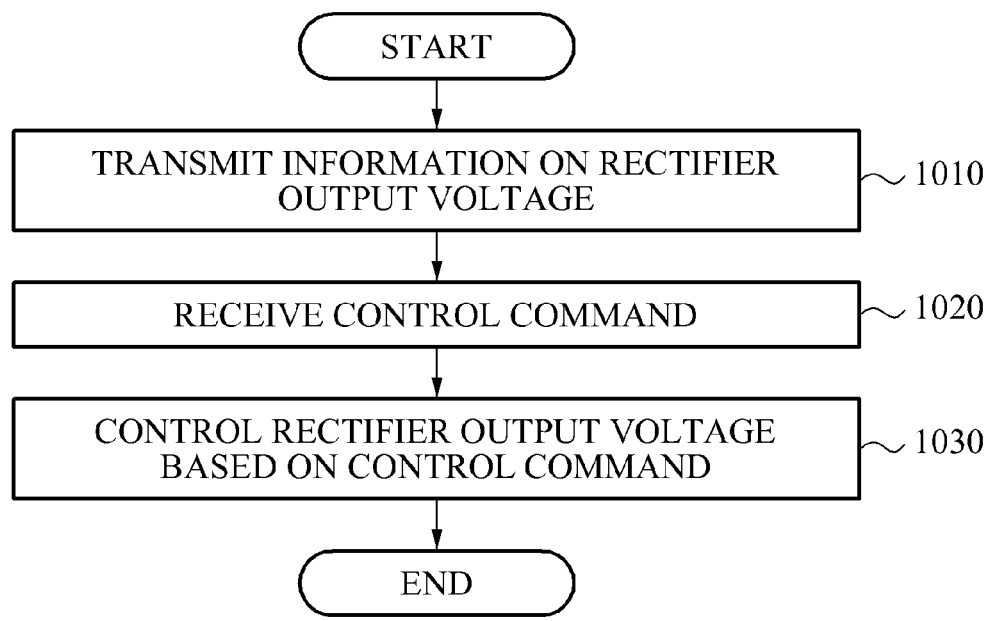
FIG. 10 illustrates an example of a method of compensating for mismatching in rectifier output voltages between wireless power reception apparatuses by a wireless power reception apparatus.

FIG. 10 illustrates an example of a method of compensating for mismatching in rectifier output voltages between wireless power reception apparatuses by a wireless power reception apparatus.

Referring to FIG. 10, in 1010, the wireless power reception apparatus transmits information on a rectifier output voltage $V_{rect}$ to a wireless power transmission apparatus. The information on the rectifier output voltage $V_{rect}$ is information on a voltage output from a rectifier of the wireless power reception apparatus. The wireless power reception apparatus may obtain the information on the rectifier output voltage $V_{rect}$ using a $V_{rect}$ detector connected to an output of the rectifier.

In 1020, the wireless power reception apparatus receives a control command from the wireless power transmission apparatus. The control command is a command for compensating for mismatching between rectifier output voltages $V_{rect}$ of a plurality of wireless power reception apparatuses. The control command may include a command that enables the wireless power reception apparatus to perform impedance matching with the wireless power transmission apparatus, or a signal that enables the wireless power reception apparatus to control the received wireless power. A description of the control command is provided in the preceding description of operation 730 of FIG. 7, and thus a duplicated description will be omitted for conciseness.

In 1030, the wireless power reception apparatus controls the rectifier output voltage $V_{rect}$ based on the control command received from the wireless power transmission apparatus. A method of controlling the rectifier output voltage $V_{rect}$ by the wireless power reception apparatus may include (1) a method of controlling the rectifier output voltage $V_{rect}$ by controlling an impedance matching circuit of the wireless power reception apparatus, and (2) a method of controlling the rectifier output voltage $V_{rect}$ by controlling an output power of a DC/DC converter of the wireless power reception apparatus.

When the plurality of wireless power reception apparatuses control the rectifier output voltages $V_{rect}$ based on a control command of the wireless power transmission apparatus, the mismatching may be compensated for between the rectifier output voltages $V_{rect}$ of the plurality of wireless power reception apparatuses. In this example, the wireless power transmission apparatus may control the rectifier output voltages $V_{rect}$ of the plurality of wireless power reception apparatuses to perform impedance matching between the wireless power transmission apparatus and the plurality of wireless power reception apparatuses.

Figure 11:
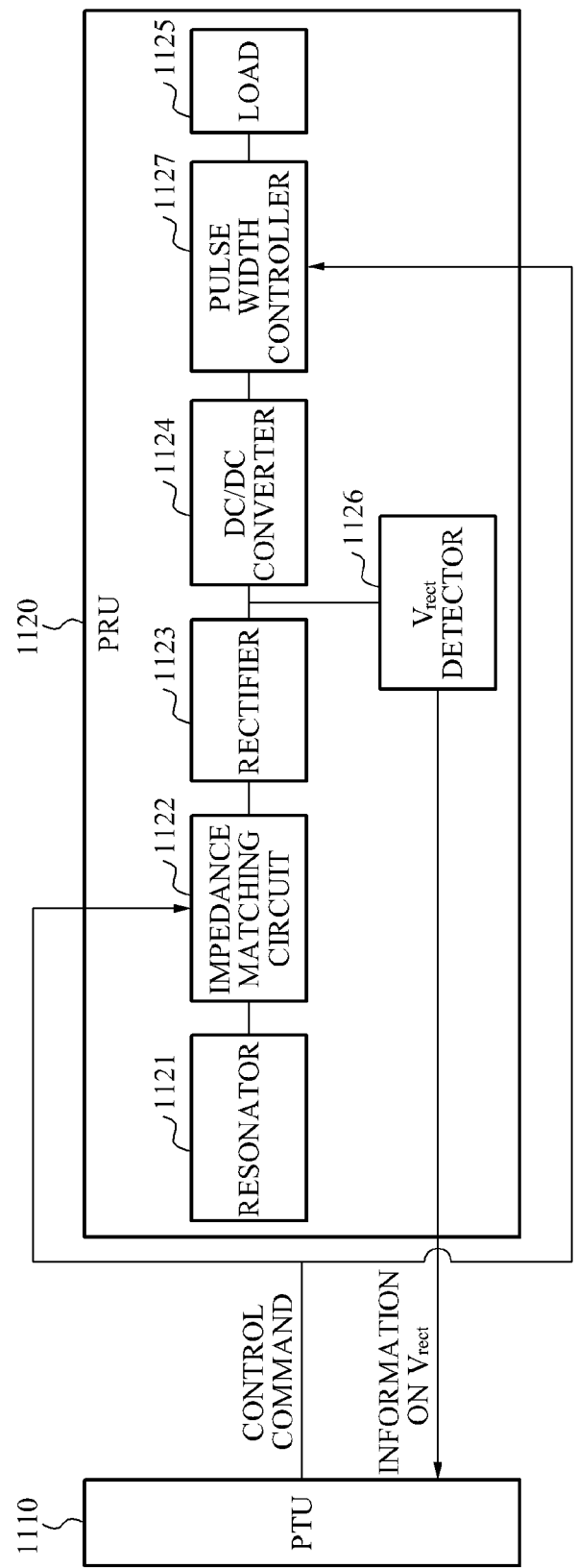
FIG. 11 illustrates an example of an impedance control system from the viewpoint of a power receiving unit (PRU).

FIG. 11 illustrates an example of an impedance control system from the viewpoint of a PRU Referring to FIG. 11, the impedance control system includes a PTU 1110 and a PRU 1120. The PRU 1120 includes a resonator 1121, an impedance matching circuit 1122, a rectifier 1123, a DC/DC converter 1124, a load 1125, a $V_{rect}$ detector 1126, and a pulse width controller 1127.

The impedance matching circuit 1122 receives an impedance matching control command from the PTU 1110, and performs impedance matching between the PTU 1110 and the PRU 1120. The impedance matching control command may be received through a communication unit (not shown) of the PRU 1120 and provided to the impedance matching circuit 1122. The impedance matching circuit 1122 and the pulse width controller 1127 may be included in a controller (not shown).

The rectifier 1123 converts an AC signal received from the PTU 1110 through the resonator 1121 to a DC signal. An output voltage $V_{rect}$ of the rectifier 1123 is detected by the $V_{rect}$ detector 1126. The $V_{rect}$ detector 1126 transmits information on the detected rectifier output voltage $V_{rect}$ to the PTU 1110. The information on the rectifier output voltage $V_{rect}$ may be transmitted through the communication units (not shown) of the PRU 1120 and the PTU 1110.

The DC/DC converter 1124 adjusts a level of the DC signal output from the rectifier 1123 to a level required by the load 1125. The pulse width controller 1127 adjusts a power supplied to the load 1125 by controlling a pulse width of an output of the DC/DC converter 1124 based on a control command received from the PTU 1110.

The descriptions provided with reference to FIGS. 6 through 10 are also applicable to each unit shown in FIG. 11, and thus duplicated descriptions will be omitted for conciseness.

The Tx controller 114, the communication units 115 and 124, and the Rx controller 125 in FIG. 1, the communication unit 911, the driving voltage unit 912, and the impedance matching control circuit 913 in FIG. 9, and the impedance matching circuit 1122 and the pulse width controller 1127 in FIG. 11 that perform the various operations described with respect to FIGS. 2A, 2B, 3A, 3B, 4A, 4B, 5-8, and 10 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a wireless power transmission apparatus, the method comprising:
   receiving information on rectifier output voltages from at least one wireless power reception apparatus;
   comparing the rectifier output voltages to one another;
   transmitting, to the at least one wireless power reception apparatus, a control command to compensate for mismatching among the rectifier output voltages;
   determining whether the rectifier output voltages are within a predetermined operating range based on the information on the rectifier output voltages; and
   controlling an impedance of the wireless power transmission apparatus based on a result of the determining.

2. The method of claim 1, further comprising inputting the information on the rectifier output voltages into an impedance matching control circuit of the wireless power transmission apparatus; and
   the controlling comprises operating the impedance matching control circuit to control the impedance of the wireless power transmission apparatus based on the result of the determining.

3. The method of claim 2, further comprising inputting the information on the rectifier output voltages input into a driving voltage unit of the wireless power transmission apparatus; and
   the controlling further comprises operating the driving voltage unit to control the impedance of the wireless power transmission apparatus by adjusting a driving voltage to be applied to the wireless power transmission apparatus based on the result of the determining.

4. The method of claim 1, further comprising inputting the information on the rectifier output voltages into a driving voltage unit of the wireless power transmission apparatus; and
   the controlling comprises operating the driving voltage unit to control the impedance of the wireless power transmission apparatus by adjusting a driving voltage to be applied to the wireless power transmission apparatus based on the result of the determining.

5. The method of claim 1, wherein the predetermined operating range comprises one of:
   an optimum voltage of each of the rectifier output voltages;
   an allowable minimum value and an allowable maximum value of each of the rectifier output voltages;
   an on-state range of each of the rectifier output voltages; and
   a range calculated based on information on a wireless power transmission efficiency of a wireless power transmitted to the at least one wireless power reception apparatus.

6. The method of claim 1, wherein the transmitting comprises transmitting, to the at least one wireless power reception apparatus, an impedance matching command for each of the at least one wireless power reception apparatus to perform impedance matching with the wireless power transmission apparatus.

7. The method of claim 1, wherein the transmitting comprises transmitting, to the at least one wireless power reception apparatus, a power control command to control an output power of a direct current-to-direct current (DC/DC) converter of each of the at least one wireless power reception apparatus.

8. The method of claim 1, wherein the transmitting comprises transmitting, to the at least one wireless power reception apparatus, a reduce power command for the at least one wireless power reception apparatus to use a reduced power of a predetermined level.

9. The method of claim 1, further comprising:
   calculating a high impedance region and a low impedance region based on the information on the rectifier output voltages; and
   setting a reference impedance between the calculated high impedance region and the calculated low impedance region;
   wherein the controlling comprises controlling the impedance of the wireless power transmission apparatus based on the reference impedance.

10. The method of claim 1, wherein the determining of whether the rectifier output voltages are within a predetermined operating range is performed by the wireless power transmission apparatus.

11. A method of operating a wireless power reception apparatus, the method comprising:
    transmitting information on a rectifier output voltage to a wireless power transmission apparatus;
    receiving a control command from the wireless power transmission apparatus; and
    controlling the rectifier output voltage based on the control command,
    wherein the control command is generated by the wireless power transmission apparatus based on comparing rectifier output voltages to one another, the rectifier output voltages comprising the rectifier output voltage in the information transmitted to the wireless power transmission apparatus,
    wherein whether the rectifier output voltages are within a predetermined operating range is determined by the wireless power transmission apparatus based on the rectifier output voltages, and wherein an impedance of the wireless power transmission apparatus is controlled by the wireless power transmission apparatus based on a result of the determining.

12. The method of claim 11, wherein the controlling comprises controlling an impedance of the wireless power reception apparatus based on the control command using an impedance matching control circuit of the wireless power reception apparatus.

13. The method of claim 11, wherein the controlling comprises controlling an output power of a direct current-to-direct current (DC/DC) converter of the wireless power reception apparatus based on the control command.

14. The method of claim 11, wherein the wireless power reception apparatus receives the control command from the wireless power transmission apparatus and controls the rectifier output voltage based on the control command.

15. A wireless power transmission apparatus comprising:
a communication unit configured to receive information on rectifier output voltages from at least one wireless power reception apparatus;
a processor configured to:
compare the rectifier output voltages to one another,
control the communication unit to transmit, to the at least one wireless power reception apparatus, a control command to compensate for mismatching among the rectifier output voltages, and
determine whether the rectifier output voltages are within a predetermined operating range; and
an impedance matching control circuit configured to control an impedance of the wireless power transmission apparatus based on a result of the determining.

16. The apparatus of claim 15, wherein the communication unit is further configured to provide the information on the rectifier output voltages to the impedance matching control circuit; and
the impedance matching control circuit is further configured to be operated to control the impedance based on the result of the determining.

17. The apparatus of claim 15, further comprising a driving voltage unit configured to supply a driving voltage to the wireless power transmission apparatus;
wherein the communication unit is further configured to provide the information on the rectifier output voltages to the driving voltage unit; and
the driving voltage unit is further configured to be operated to control the impedance of the wireless power transmission apparatus by adjusting the driving voltage based on the result of the determining.

* * * * *